(12) United States Patent
Nguyen

(10) Patent No.: US 6,893,766 B2
(45) Date of Patent: May 17, 2005

(54) METHODOLOGY FOR SUPPLY OF REACTANT FLUIDS TO AND PURGING OF PRODUCT AND INERT FLUIDS FROM CELLS OF FUEL CELL STACK

(75) Inventor: Trung Van Nguyen, Lawrence, KS (US)

(73) Assignee: TVN Systems, Inc., Lawrence, KS (US)

( * ) Notice: Subject to any disclaimer, the term of this patent is extended or adjusted under 35 U.S.C. 154(b) by 139 days.

(21) Appl. No.: 10/160,543

(22) Filed: May 31, 2002

(65) Prior Publication Data

US 2002/0146603 A1 Oct. 10, 2002

Related U.S. Application Data

(62) Division of application No. 09/552,419, filed on Apr. 19, 2000, now Pat. No. 6,503,651.

(51) Int. Cl.⁷ ............................................. H01M 2/00
(52) U.S. Cl. .......................... 429/34; 429/22; 429/39; 429/50
(58) Field of Search ............................. 429/22, 34, 39, 429/50

(56) References Cited

U.S. PATENT DOCUMENTS

| | | | | |
|---|---|---|---|---|
| 3,553,026 A | 1/1971 | Winsel | ........................ | 136/86 |
| 4,037,024 A | 7/1977 | Landau | | |
| 4,243,731 A | * | 1/1981 | Cheron | ........................ 429/13 |
| 4,317,864 A | 3/1982 | Strasser | ........................ | 429/36 |
| 4,407,904 A | 10/1983 | Uozumi et al. | ................ | 429/26 |
| 4,533,607 A | 8/1985 | Sederquist | ..................... | 429/13 |
| 4,555,452 A | 11/1985 | Kahara et al. | ................. | 429/13 |
| 4,593,534 A | 6/1986 | Bloomfield | ................... | 62/201 |
| 5,141,823 A | 8/1992 | Wright et al. | | |
| 5,149,599 A | 9/1992 | Kamoshita | ..................... | 429/13 |
| 5,200,278 A | * | 4/1993 | Watkins et al. | ................ 429/24 |
| 5,316,869 A | 5/1994 | Perry, Jr. et al. | ............... | 429/19 |
| 5,478,662 A | 12/1995 | Strasser | ........................ | 429/13 |
| 5,631,540 A | 5/1997 | Nguyen | ........................ | 320/30 |
| RE36,148 E | 3/1999 | Strasser | ........................ | 429/13 |
| 6,103,409 A | 8/2000 | Bosco et al. | | |
| 6,218,038 B1 | 4/2001 | Oko et al. | | |
| 6,242,120 B1 | * | 6/2001 | Herron | ........................ 429/22 |

* cited by examiner

*Primary Examiner*—Dah-Wei Yuan
(74) *Attorney, Agent, or Firm*—James H. Marsh, Jr.; Stinson Morrison Hecker LLP (57) ABSTRACT

A fuel cell system made up of a plurality of fuel cells. Each cell includes a fuel inlet, an oxidant inlet, a fuel side product outlet and an oxidant side product outlet. A common fuel supply line is provided for the fuel inlets. A common oxidant supply line is provided for the oxidant inlets. A common product purging mechanism is coupled to the outlets for purging the same of unused fuel, unused oxidant, fuel side product and oxidant side product. The product purging mechanism includes valving structure operable to selectively and independently open the outlets of a given cell. A method for operating such a fuel cell system includes supplying fuel to the fuel inlets from a common source of fuel and supplying an oxidant to the oxidant inlets from a common source of oxidant. The outlets of a given cell are selectively opened to purge fuel product and oxidant product from the given cell while the outlets of other cells are kept closed.

23 Claims, 7 Drawing Sheets

METHODOLOGY FOR SUPPLY OF REACTANT FLUIDS TO AND PURGING OF PRODUCT AND INERT FLUIDS FROM CELLS OF FUEL CELL STACK

CROSS-REFERENCE TO RELATED APPLICATION

This application is a divisional of presently application Ser. No. 09/552,419 filed Apr. 19, 2000, now U.S. Pat. No. 6,503,651 and priority is claimed therefrom pursuant to 35 U.S.C. § 120. The entirety of the disclosure of said application Ser. No. 09/552,419 is specifically incorporated herein by this specific reference thereto.

BACKGROUND OF THE INVENTION

1. Field of the Invention

The present invention relates generally to the field of fuel cells and, more particularly to methodology and apparatus for controlling the supply of reactant fluids to the cells and the purging of reaction products and inert fluids from the individual cells and/or groups of cells of a cell stack. In particular the invention relates to methodology and apparatus for tailoring the supply of fuel to and removal of reaction products from cells so as to meet the individual demands of each respective cell and/or group of cells in a stack of cells.

2. The State of the Prior Art

Fuel cells are electromechanical devices that convert chemical energy in the form of fuel and an oxidant directly into electrical energy. Fuel cells are generally classified in accordance with the type of electrolyte (e.g., alkaline, phosphoric acid, solid polymer, molten carbonate, solid oxide) used to provide ionic conduction between an anode and a cathode. Useful fuel cells include PEM fuel cells, acidic fuel cells and alkaline fuel cells. In this regard, PEM is the abbreviation for polymer electrolyte membrane or proton exchange membrane, and such membranes are proton-conducting thus facilitating the use thereof as an electrolyte for transporting protons from the anode to the cathode of the cell. The present invention is generally applicable to each of these types of cells.

A fuel cell generally includes seven major components, namely, 1) an anode current collector acting as the negative terminal to conduct electrons away from the cell; 2) a fluid plate to distribute and supply fuel to the anode and provide electrical contact between the anode current collector and the anode; 3) an anode comprising a porous diffusion layer and a catalyst layer where fuel is oxidized (e.g. hydrogen fuel is oxidized to form protons and electrons); 4) an electrolyte to provide ionic conduction between the anode and the cathode, which in the case of a PEM fuel cell is a proton conducting membrane; 5) a cathode with similar structure to that of the anode where an oxidant is reduced (e.g., oxygen reacts with protons and electrons to form water); 6) a fluid distributor plate to distribute and supply oxidant to the cathode and provide electrical contact between the cathode and a cathode current collector; and 7) a cathode current collector acting as a positive terminal to conduct electrons back to the cell.

During operation of a fuel cell, a fuel such as hydrogen is caused to flow into the cell through a fuel inlet, and the fuel is distributed by the fuel distributor plate on the anode side of the fuel cell. Hydrogen diffuses from the fuel distributor plate through the anode diffusion layer to the catalyst layer in the anode, where it is oxidized to form protons and electrons. The electrons are conducted out of the anode, through the fuel distributor plate, to the anode current collector, and out of the cell to power an electrical device. The protons are transported across the PEM to the cathode.

An oxidant such as oxygen is caused to flow into the cell through an oxidant inlet, and the oxidant is distributed by the oxidant distributor plate on the cathode side of the cell. Oxygen diffuses from the oxidant distributor plate through the cathode diffusion layer to the catalyst layer in the cathode, where it reacts with the protons generated in the anode and electrons to form water. The electrons are conducted from the electrical device back to the cell and to the cathode via the cathode current collector and the oxidant fluid distributor plate. The product water produced at the catalyst layer in the cathode diffuses through the cathode diffusion layer to flow channels in the oxidant fluid distributor plate and is removed from the cell by the flow of excess oxidant and/or inert materials in the incoming oxidant fluid stream.

Fuel cells typically produce a voltage which varies up to about 1.0V. Accordingly, in order to generate greater voltages, a plurality of fuel cells are stacked in series to form a fuel cell stack. The cells of a given stack generally are arranged with a common inlet for the fuel (e.g., hydrogen or methanol and water), a common outlet for the fuel, a common inlet for the oxidant (e.g., oxygen or air), and common outlet for the oxidant. The fuel and oxidant for each cell of the stack is fed to the respective cells from these common inlets, and the product water, inert materials, excess fuel and/or excess oxidant from each cell of the stack is removed from the respective cells through these common outlets. To prevent buildup of product water, inert materials, excess fuel and/or excess oxidant in the cells, and to maintain appropriately high concentrations of all reactants in all cells, continuous or frequent purging of fuel and/or oxidant has generally been required in the past. This leads to low fuel and/or oxidant utilization, whereby large amounts of parasitic power are required to provide the necessary flows of fuel and/or oxidant to the cell stack. Moreover, it is essentially impossible to provide fuel cells such that the same have identical dimensions and morphological properties (e.g., porosity, tortuosity, wetting characteristics). Thus, the flow resistance properties of the cells of a given stack are not uniform during operation.

This nonuniformity in flow resistance among the cells of a stack results in nonuniform fluid flow into and through the cells leading to nonuniform cell-to-cell performance and non-optimal stack performance. Cells having so much flow resistance that incoming flow of fuel or oxidant is inappropriately restricted and/or that proper purging of product or inert fluids is prevented become starved for fuel and/or fluid oxidant resulting in poor performance or perhaps even total failure of the cell. Adding to the non-optimal performance is the danger of explosion. In a fuel stack, cells receiving insufficient reactants to support the electrical current being drawn from the stack may go into reverse, thus generating a potentially explosive mixture in the cell. For example, when a hydrogen-oxygen cell experiences reversal, hydrogen is generated in the cathode where oxygen is present and oxygen is generated in the anode where hydrogen is present, thus provided an explosive fluid mixture of hydrogen and oxygen in both compartments.

In an effort to address this problem, fuel cell stacks have been used only in low current density operations and/or the same have been designed in such a way to insure that cells with the highest flow resistance obtain a sufficient supply of new reactants and are adequately purged of product and inert fluids. The latter is often accomplished by using high flow rates of reactants; however, as explained above, the use of high reactant flow rates results in low fuel and oxidant utilization and high parasitic power consumption. To minimize fuel loss in such a case, a recirculation loop is sometimes used. Such a loop is discussed in U.S. Pat. No. 5,316,869. In this scheme, recirculation blowers or pumps are used to provide sufficiently high flow rates of reactant fluids through the cell stack to assure adequate flow of fresh reactants to and purging of product and inert fluids from each cell. To assure that the entire loop is not saturated with product or inert fluids, a purging line is generally incorporated in the loop. Such purging line may be designed to be open continuously to remove the fluid mixture at such a rate that the system is not saturated with product or inert fluids. Alternatively the purging line may be designed for opening only when reactant fluid concentrations drop below a certain set value or when concentrations of product and/or inert fluids exceed certain set values. In the alternative case, a fluid sensor may be used to detect the concentrations which are being monitored. Either purging process results in high fuel loss rate and high parasitic power consumption to power the recirculation system.

The problem of properly disposing of product and inert gas is further addressed in U.S. Re. Pat. No. 36,148. This patent describes a fuel stack arrangement wherein the cells are divided into groups of cells that, on both the fuel side and the oxidant side, have parallel gas feed within each group, but serial feed from group to group. That is to say, on both the cathode side and the anodes side, reactant fluid is fed to the cells of the first group of cells in parallel. On the anode side, the exhaust from the first group is collected and fed to the cells of a second group of cells in parallel. Flow on the anode side continues in like manner for as many groups as are included in the stack. On the cathode side, liquid water product is separated from the exhaust, and the remainder of the first group exhaust is collected and fed to the cells of the second group of cells in parallel. Flow and water product removal on the cathode side continues in like manner for as many groups as are included in the stack.

The sequential feeding of the exhaust from one group of cells to the inlet of another group of cells presents a number of disadvantages as follows:

1) The fluid feed composition varies from group to group as the fluid traverses the stack. For example, when air is used as an oxidant, the oxidant containing feed stream becomes leaner in oxygen and richer in nitrogen as the fluid flows from one group to the next. Consequently, the cells of downstream groups have relatively poorer performance than the cells of upstream groups. The same is true on the fuel side of the stack.

2) travel path from stack inlet to stack outlet is longer and the amount of reactant fluid flowing through each cell group includes the amount needed for subsequent cell groups. As a result, the cell stack has a high pressure drop and requires a great deal of parasitic power to pump the fluid.

3) Since the cells of a given group are arranged for parallel fluid flow, nonuniformity among the individual cells results in nonuniform flow through the cells of a group. This problem has been discussed above.

SUMMARY OF THE INVENTION

The above problems and shortcomings of the prior art are minimized, if not eliminated entirely, through the utilization of a device and methodology which embodies the concepts and principles of the present invention. Thus, the invention provides a fuel cell system that may preferably include a plurality of fuel cells, each including a fuel inlet, an oxidant inlet, a fuel product outlet and an oxidant product outlet. The fuel cell system of the invention also includes a common fuel supply line interconnecting the fuel inlets and a common oxidant supply line interconnecting the oxidant inlets.

In one important aspect of the invention, the system may preferably include a fuel product purging mechanism that is coupled to the fuel product outlets and which incorporates fuel product valving structure operable to selectively and independently open each of the fuel product outlets. In another important aspect of the invention, the system may instead include an oxidant product purging mechanism that is coupled to the oxidant product outlets and which incorporates oxidant product valving structure operable to selectively and independently open each of said oxidant product outlets. In another important aspect of the invention, the system may ideally include a product purging mechanism that is coupled to the product outlets and which incorporates product valving structure operable to selectively and independently open each of said product outlets.

An important feature of the preferred embodiment of the invention is the inclusion of a separate fuel product valve for each fuel product outlet and/or a separate oxidant product valve for each oxidant product outlet.

In one highly preferred form of the invention, the fuel product valving structure include a stationary element and a moveable element. Preferably, the stationary element has an external surface and includes a plurality of fuel product ports that extend therethrough. Each of the fuel product ports preferably has one end that is connected to a respective fuel product outlet and a second end that opens through the external surface. The moveable element preferably has a valve surface that is in engagement with the external surface. The moveable element preferably has at least one fuel product collection conduit that extends therethrough and opens at said valve surface. The moveable element preferably is moveable relative to the stationary element so as to register said conduit with the second end of a selected one of said ports.

In another highly preferred form of the invention, the oxidant product valving structure include a stationary element and a moveable element. Preferably, the stationary element has an external surface and includes a plurality of oxidant product ports that extend therethrough. Each of the oxidant product ports preferably has one end that is connected to a respective oxidant product outlet and a second end that opens through the external surface. The moveable element preferably has a valve surface that is in engagement with the external surface. The moveable element preferably has at least one oxidant product collection conduit that extends therethrough and opens at said valve surface. The moveable element preferably is moveable relative to the stationary element so as to register said conduit with the second end of a selected one of said ports.

In a particularly preferred form of the invention, the system may include a common product valving structure. In this highly preferred form of the invention, the product valving structure includes a stationary element and a moveable element. Preferably, the stationary element has an external surface and includes a plurality of product ports that extend therethrough. Each of the product ports preferably has one end that is connected to a respective product outlet and a second end that opens through the external surface. The moveable element preferably has a valve surface that is in engagement with the external surface. The moveable element preferably has at least one oxidant product collection conduit and at least one fuel product collection conduit, which conduits extend therethrough and opens at said valve surface. The moveable element preferably is moveable relative to the stationary element so as to register said conduits with the second ends of selected ports. Ideally, in each of the cases outlined above, the elements are each disc-shaped, the surfaces are generally planar, and the moveable element is rotatable about an axis which is generally perpendicular to the plane of said surfaces. In this highly preferred form of the invention, the second ends of ports that are connected to fuel product outlets and said fuel product collection conduit may be arranged in a first circle that is concentric with said axis and has a first diameter, and the second ends of ports that are connected to oxidant product outlets and said oxidant product collection conduit may be arranged in a second circle that is concentric with said axis and has a second diameter that is different than said first diameter.

In another highly important embodiment, the invention provides a method for operating a fuel cell system made up of a plurality of fuel cells, each including a fuel inlet, an oxidant inlet, an openable and closeable fuel product outlet and an openable and closeable oxidant product outlet. In this embodiment, the method may comprise supplying fuel to the fuel inlets, supplying an oxidant to said oxidant inlets, and selectively opening the outlets of a given cell to purge fuel product and oxidant product from said given cell. An important preferred feature of this embodiment involves selectively keeping the outlets of other cells in a closed condition while one or more outlets of the given cell are open. In accordance with the invention, the step of selectively opening the outlets of a given cell may be conducted in such a way that the outlets of the given cell are open at the same time so as to simultaneously purge fuel product and oxidant product from the given cell. Ideally, the invention provides such a method which comprises closing the outlets of said given cell and selectively opening the outlets of a second cell to purge fuel product and oxidant product from said second cell. In this latter situation, said step of selectively opening the outlets of a second cell may be conducted in such a way that the outlets of the second cell are open at the same time so as to simultaneously purge fuel product and oxidant product from the second cell.

In a still further embodiment of the invention, a method for operating a fuel cell is provided wherein the method includes selectively opening the outlets of each cell of a given group of cells to purge fuel product and oxidant product from each of the cells of said given group of cells. In this aspect of the invention, the groups of cells may preferably be operated in the same manner as the individual cells discussed previously.

In accordance with the concepts and principles of the invention, each of the cells has an identical travel path. Moreover, the total gas travel path for each gas portion is such that only a single cell is traversed from stack inlet to outlet. In addition, in accordance with the invention, no cell must support a sufficient flow to provide reactants to a downstream cell. Furthermore, when the invention is employed, both pressure drop across the cell stack and parasitic power consumption are much lower than has been thought possible in the past.

DETAILED DESCRIPTION OF THE PREFERRED EMBODIMENTS

Figure 1:
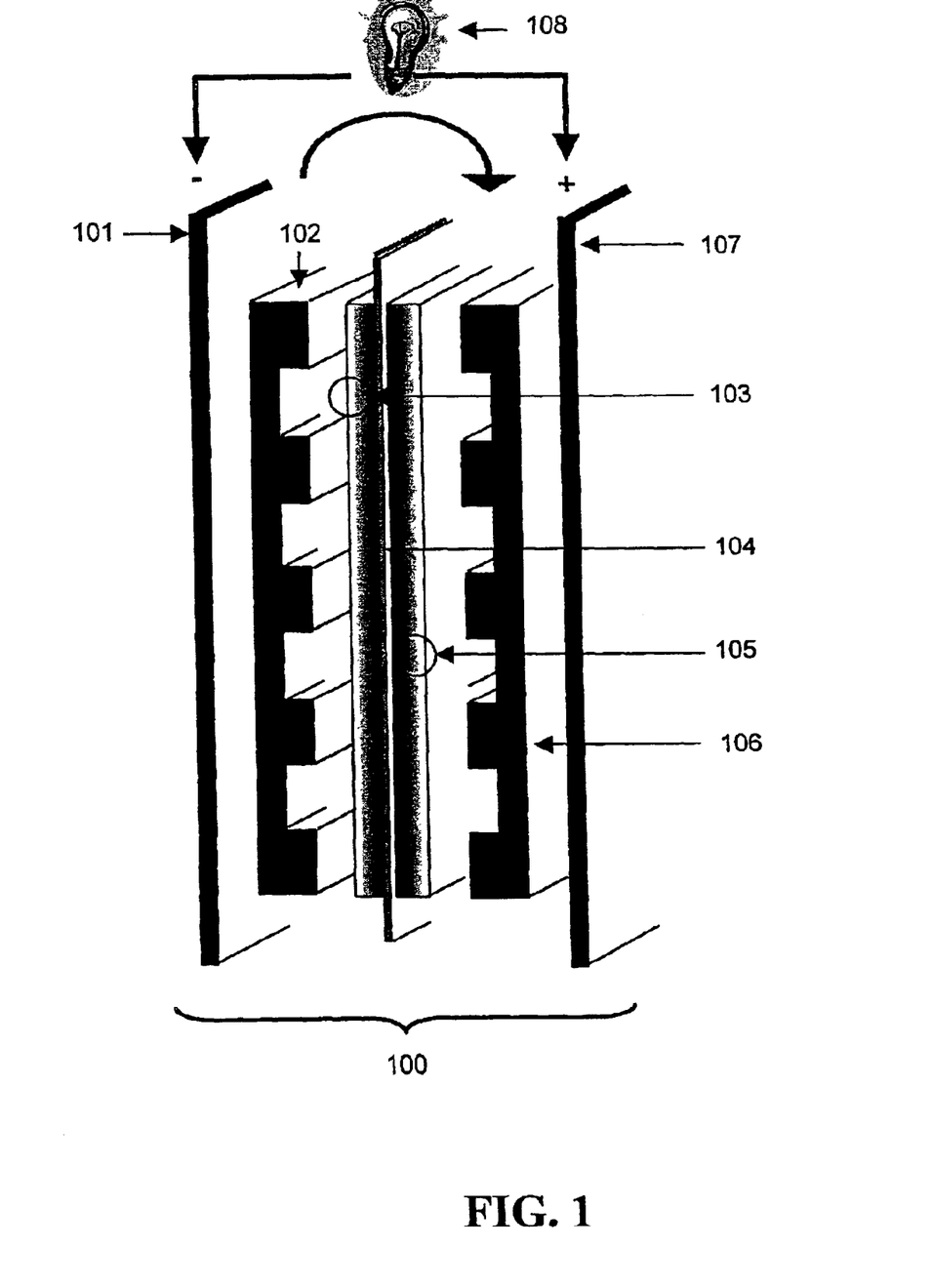
FIG. 1 is a schematic diagram of a conventional PEM fuel cell showing the major components and electrode reactions for a hydrogen/oxygen system.

A conventional Proton-Exchange-Membrane (PEM) fuel cell 100 is shown schematically in FIG. 1. Fuel cells of this sort generally include an anode current collector 101 which acts as the negative terminal for the cell, a fluid distributor for the fuel 102, an anode 103 where a fuel like hydrogen is oxidized to protons and electrons ($H_2 \rightarrow 2H^+ + 2e^-$), a proton conducting membrane (membrane electrolyte) 104, a cathode 105 where an oxidant, for example oxygen, reacts with protons and electrons to form water ($\frac{1}{2}O_2 + 2H^+ + 2e^- \rightarrow H_2O$), a fluid distributor for the oxidant 106, and a cathode current collector 107 which acts as the positive terminal for the cell. The electrical power generated by the fuel cell is used to power an electrical load 108. The three-component unit of the cell which consists of the anode 103, the proton conducting membrane 104 and the cathode 105 is generally referred to as a membrane-and-electrode assembly (MEA).

As discussed above, fuel cells are generally arranged in a stack capable of producing a required voltage. The fuel cell stack may include a plurality of fuel cells connected in series. By way of example, a fuel cell stack 200, which includes three cells 210, 220, 230 that are electrically connected in series is shown schematically in FIG. 2. It is to be noted here that those skilled in the fuel cell art will readily recognize that the stack may include any number of cells as may be required by an application and that the present invention is in no way limited to a three cell stack.

Figure 2:
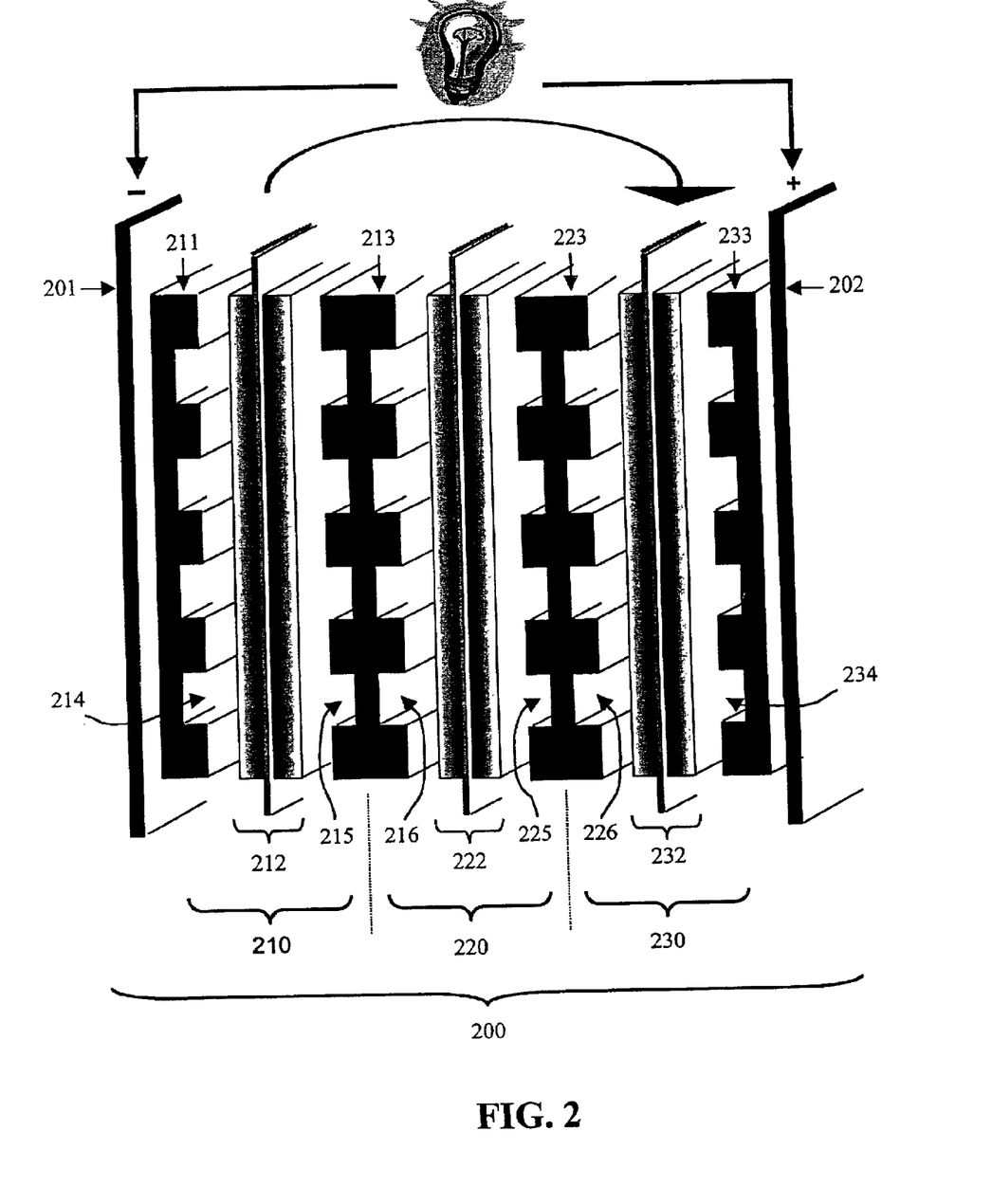
FIG. 2 is a schematic diagram of a conventional PEM fuel cell stack with three cells connected electrically in series.

The three-cell stack illustrated in FIG. 2 includes a negative current collector 201, a monopolar fuel distributor plate 211 having fluid channels 214 for delivering fuel to the fuel side of fuel cell 210, a MEA 212 for fuel cell 210, a bipolar fluid distributor plate 213 that has fluid channels 215 on one side for delivering oxidant to the oxidant side of fuel cell 210 and fluid channels 216 on the other side for delivering fuel to the fuel side of fuel cell 220, a MEA 222 for fuel cell 220, another bipolar fluid distributor plate 223 with channels 225 on one side to distribute the oxidant to fuel cell 220 and channels 226 on the other side to distribute fuel to fuel cell 230, a MEA 232 for fuel cell 230, and a monopolar oxidant distributor plate having fuel distributor channels 234 for delivering fuel to the fuel side of fuel cell 230. The total voltage of the stack is the sum of the individual cell voltages.

Figure 3:
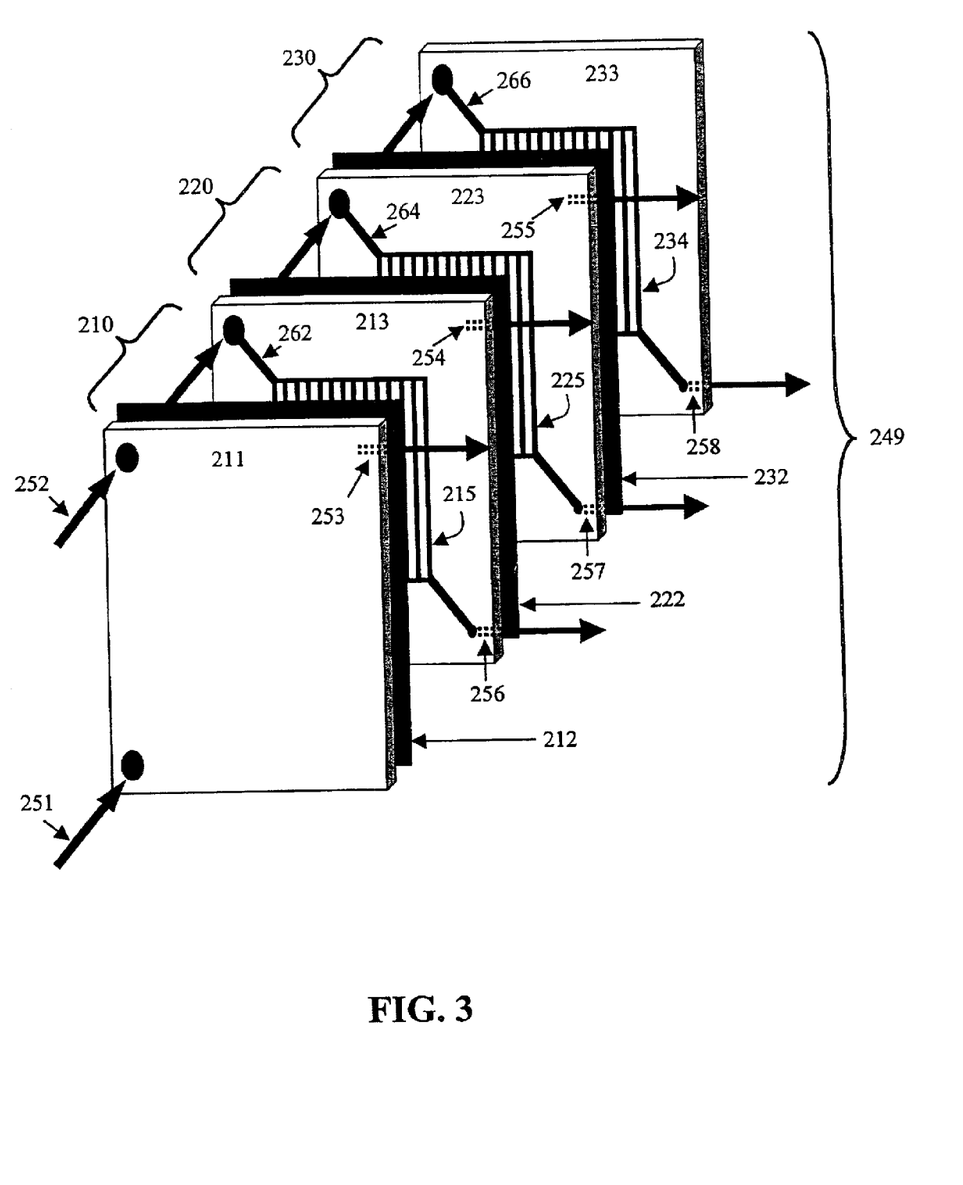
FIG. 3 is a schematic diagram of a three-cell fuel cell stack which embodies the principles and concepts of the invention with common fuel and oxidant inlets and individual outlets for each cell in the stack.
Figure 4:
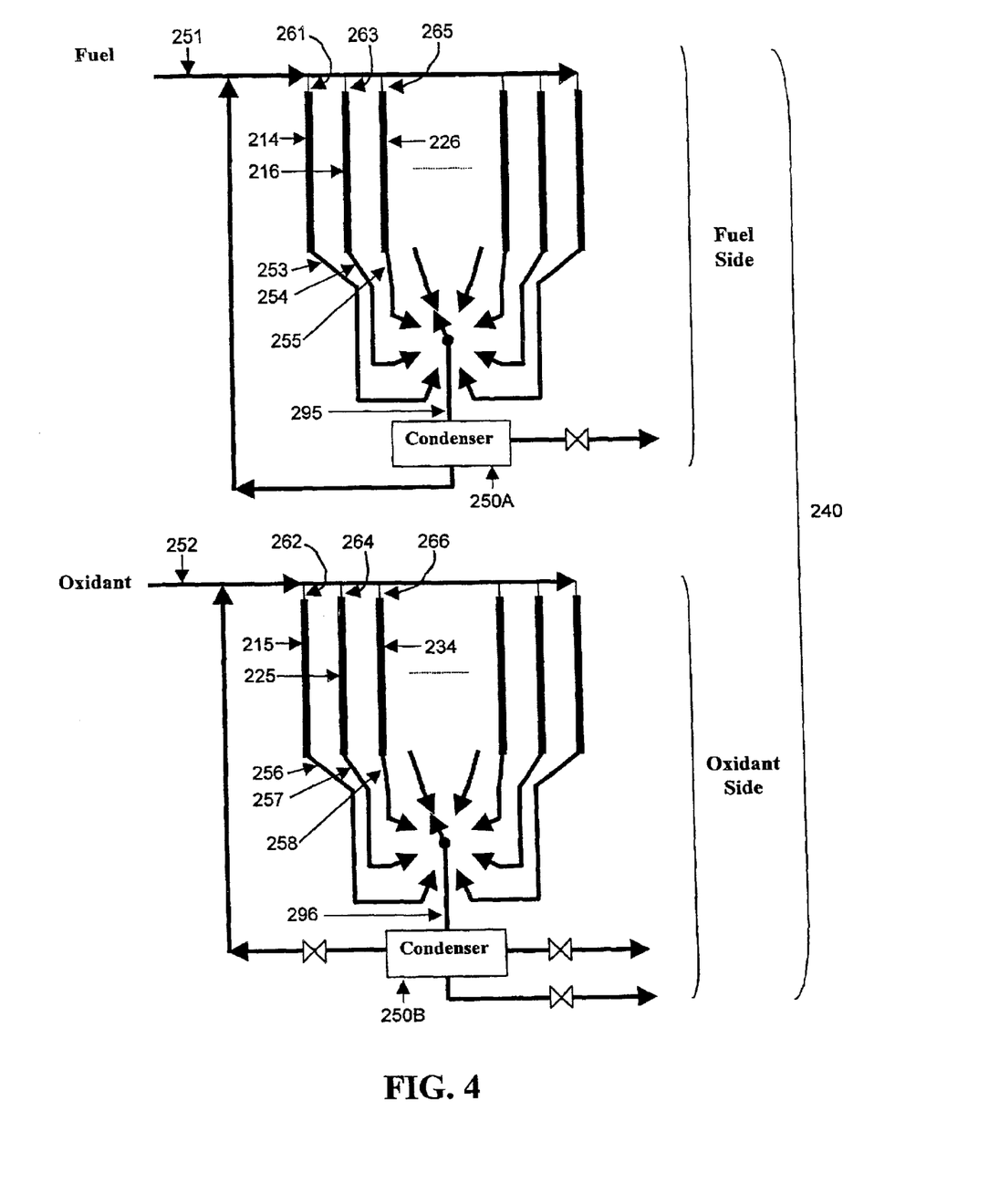
FIG. 4 is a block diagram of the fuel cell stack of FIG. 3.

A three-cell fuel cell stack 249, which includes cells 210, 220 and 230, and which embodies the principles and concepts of the invention, is shown in FIGS. 3 and 4. The cells 210, 220 and 230 are connected electrically in series in the same way as shown for stack 200 of FIG. 2. Cell 210 has a fuel inlet 261 (on the back side of plate 211), an oxidant inlet 262, a fuel side product outlet 253 and an oxidant side product outlet 256. Cell 220 has a fuel inlet 263 (on the back side of plate 213), an oxidant inlet 264, a fuel side product outlet 254 and an oxidant side product outlet 257. Cell 230 has a fuel inlet 265 (on the back side of plate 223), an oxidant inlet 266, a fuel side product outlet 255 and an oxidant side product outlet 258. Operationally, outlet 253 is in fluid communication with channels 214 (on the back side of plate 211), outlet 254 is in fluid communication with channels 216 (on the back side of plate 213), outlet 255 is in fluid communication with channels 226 (on the back side of plate 223), outlet 256 is in fluid communication with channels 215, outlet 257 is in fluid communication with channels 225, and outlet 258 is in fluid communication with channels 234.

The fluid distribution system for the three-cell stack of FIG. 3 includes a common fuel supply line 251 which interconnects fuel inlets 261, 263 and 265 and a common oxidant supply line 252 which interconnects oxidant inlets 262, 264 and 266. The distribution system also includes distribution channels 214, 215, 216, 225, 226 and 234, individual fuel side product outlets 253, 254 and 255, and individual oxidant side product outlets 256, 257 and 258. Outlets 253 through 258 may all be connected externally to a device 240 as illustrated in FIG. 8 which may allows only one outlet or one set of outlets to be open at any given time. The device 240, which is explained in greater detail below, may be referred to hereinafter as an external sequential purging device or as a common product purging mechanism. In either case, the same includes valving structure operable to selectively and independently open the outlets of a given cell or group of cells. As illustrated in FIG. 4, device 240 may be arranged to accommodate purging of number of cells in addition to cells 210, 220 and 230. For example device 240 as shown is arranged to accommodate purging of both fuel and oxidant sides of 8 cells. In practice, as would be readily recognized by the routineer in the fuel cell art, device 240 may be arranged to accommodate as many cells as might be included in a group or stack of cells.

As illustrated in FIGS. 3 and 4, common fuel supply line 251 distributes fuel to fuel cells 210, 220 and 230 of stack 249. That is to say, common fuel supply line 251 interconnects fuel inlets 261, 263 and 265 and thereby distributes fuel to fuel channel 214 on the back face of plate 211 for fuel cell 210 and to the fuel channels 216 and 226 on the back faces of plates 213 and 223 respectively for fuel cells 220 and 230. Unused fuel and fuel side products from fuel cells 210, 220 and 230 are removed through fuel side outlets 253, 254 and 255 which are openable and closeable by virtue of being associated with device 240. From the foregoing it is clear that the fuel sides of the cells 210, 220 and 230 are operated in parallel with regard to fuel side flow.

As is also illustrated in FIGS. 3 and 4, common oxidant supply line 252 distributes oxidant to fuel cells 210, 220 and 230 of stack 249. That is to say, common oxidant supply line 252 interconnects fuel inlets 262, 264 and 266 and thereby distributes oxidant to oxidant channel 215 on the front face of plate 213 for fuel cell 210 and to the oxidant channels 225 and 234 on the front faces of plates 223 and 233 respectively for fuel cells 220 and 230. Unused oxidant and oxidant side products from fuel cells 210, 220 and 230 are removed through oxidant side outlets 256, 257 and 258 which are openable and closeable by virtue of being associated with device 240. From the foregoing it is also clear that the oxidant sides of the cells 210, 220 and 230 are also operated in parallel with regard to oxidant side flow.

Figure 7:
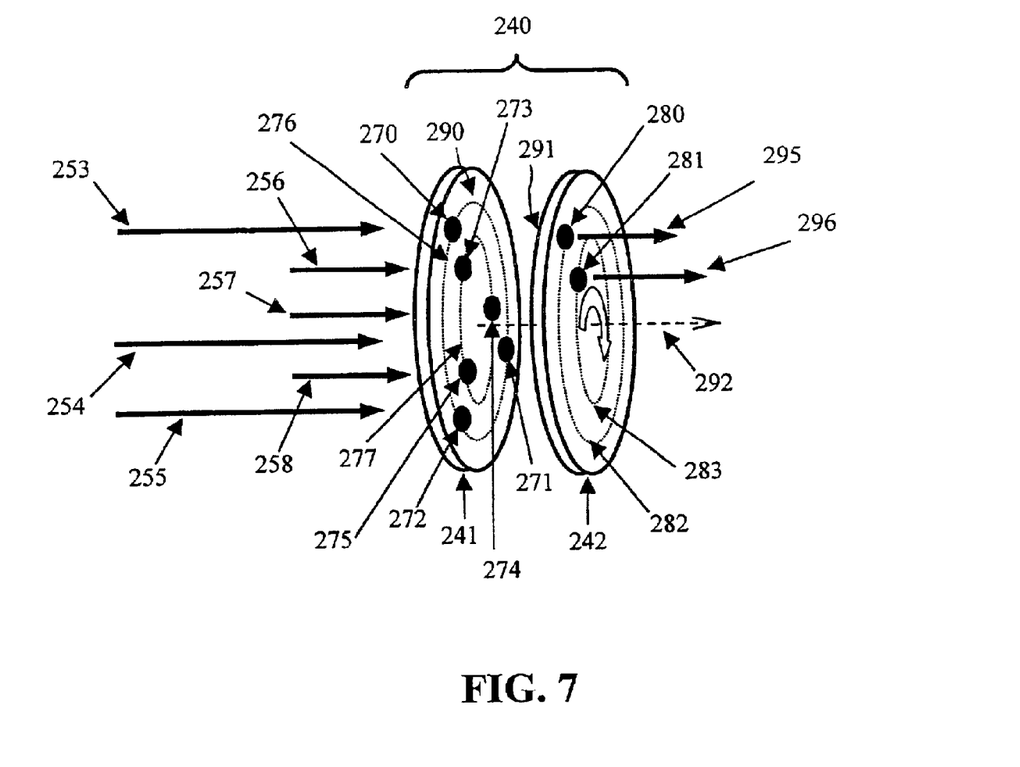
FIG. 7 is a schematic diagram of a device useful in connection with the fuel cell stack of FIGS. 3 and 4 to allow only one outlet or sets of outlets to open at a time.

As shown in FIG. 7, external sequential purging device 240 may preferably have two main components, namely a preferably disc shaped stationary plate 241 and a preferably disc shaped moveable plate 242. For a three cell group, stationary plate 241 may preferably have three fuel side ports 270, 271 and 272 which extend therethrough and which are aligned on a circle 276. Stationary plate 241 may also preferably have three oxidant side ports 273, 274 and 275 which extend therethrough and which are aligned on a circle 277. Fuel side outlets 253, 254 and 255 carrying unused fuel and fuel side product from cells 210, 220 and 230 are respectively connected in fluid communication with the upstream ends of of ports 270, 271 and 272, and oxidant side outlets 256, 257 and 258 carrying unused oxidant and oxidant side product are respectively connected in fluid communication with the upstream ends of ports 273, 274 and 275.

Disc 241 preferably has an external generally planar surface 290 which engages a generally planar valve surface 291 on the back of plate 242. As can be appreciated viewing FIG. 7, ports 270 through 275 have respective downstream ends which open through surface 290. Moveable plate 242 is preferably mounted for rotation relative to plate 241 about an axis 292 that is generally perpendicular to surfaces 290 and 291. Circles 276 and 277 are concentric with axis 292. Rotating plate 242 has two through-holes 280 and 281 which are aligned on circles 282 and 283 that match with circles 276 and 277 on stationary plate 241. Circles 282 and 283 are also concentric with axis 292. Hole 280 is connected in fluid communication with a common fuel side collection conduit 295 which serves as a purge outlet for the fuel outlets from the fuel cell stack 249. Hole 281 is connected in fluid communication with a common oxidant side collection conduit 296 which serves as a purge outlet for the oxidant outlets from fuel cell stack 249.

During operation rotating plate 242 rotates so as to register hole 280 with the downstream end of a selected one of the ports 270, 271 and 272 and so as to register hole 281 with the downstream end of a selected one of the ports 273, 274 and 275. Thus, each set of outlets opens in sequence to purge a given cell which is connected to such set of outlets of product and inert fluids. This purging also causes the given cell to be supplied with new reactants. The duration and frequency of purging for each cell or group of selected cells may be controlled by the rotation speed of the rotating plate and placement of ports thereon. It should be noted that it is not critical that the fuel side and the oxidant sides of a given cell be purged simultaneously. In this same regard, it may be necessary to purge one side of a cell more often than the other side. Thus, the arrangement of the common purging mechanism may need to be designed to accommodate the necessities of a given system insofar as the timing and sequencing of the various product outlets is concerned. Also it is to be recognized that it might be desirable in a given situation to include separate respective purging mechanisms for the fuel and oxidant sides of a cell or group of cells.

As discussed above, FIG. 4 is a block diagram of the fluid distribution in the fuel and oxidant sides of each fuel cell for a fuel cell stack configured similarly to that shown in FIG. 3. Unused oxidant and/or fuel in the respective product stream from the sequential purging device 240 can be recovered in a respective condenser 250A, 250B and recycled to the fuel cell stack for reuse. For example, when pure oxygen is used as an oxidant, the oxidant side product stream will generally contain unused oxygen and water. The water may be condensed, separated from the unused oxygen and used to humidify the fuel stream or discarded, while the unused oxygen may be recycled back to the fuel cell stack for reuse. When air, which is readily available is used as an oxidant, water may be separated from the oxidant product stream for reuse and the product stream, which includes unused oxygen and nitrogen and other inert materials, may simply be purged back into the atmosphere. Similarly, when pure hydrogen is used as a fuel, the fuel product stream may contain both unused hydrogen and water. Since water is needed to humidify the hydrogen stream there generally is no need to separate water from the fuel product stream. The fuel product stream may be recycled directly back to the fuel cell stack for reuse. However, when a non-pure hydrogen gas, such as, for example, a reformate gas containing hydrogen, nitrogen and carbon dioxide is used as a fuel, it may be desirable to separate water from the fuel side product stream and recycle the recovered water for reuse. Unused hydrogen along with inert gases like nitrogen and carbon dioxide may be sent to a gas burner to generate heat or additional useful work.

Figure 5:
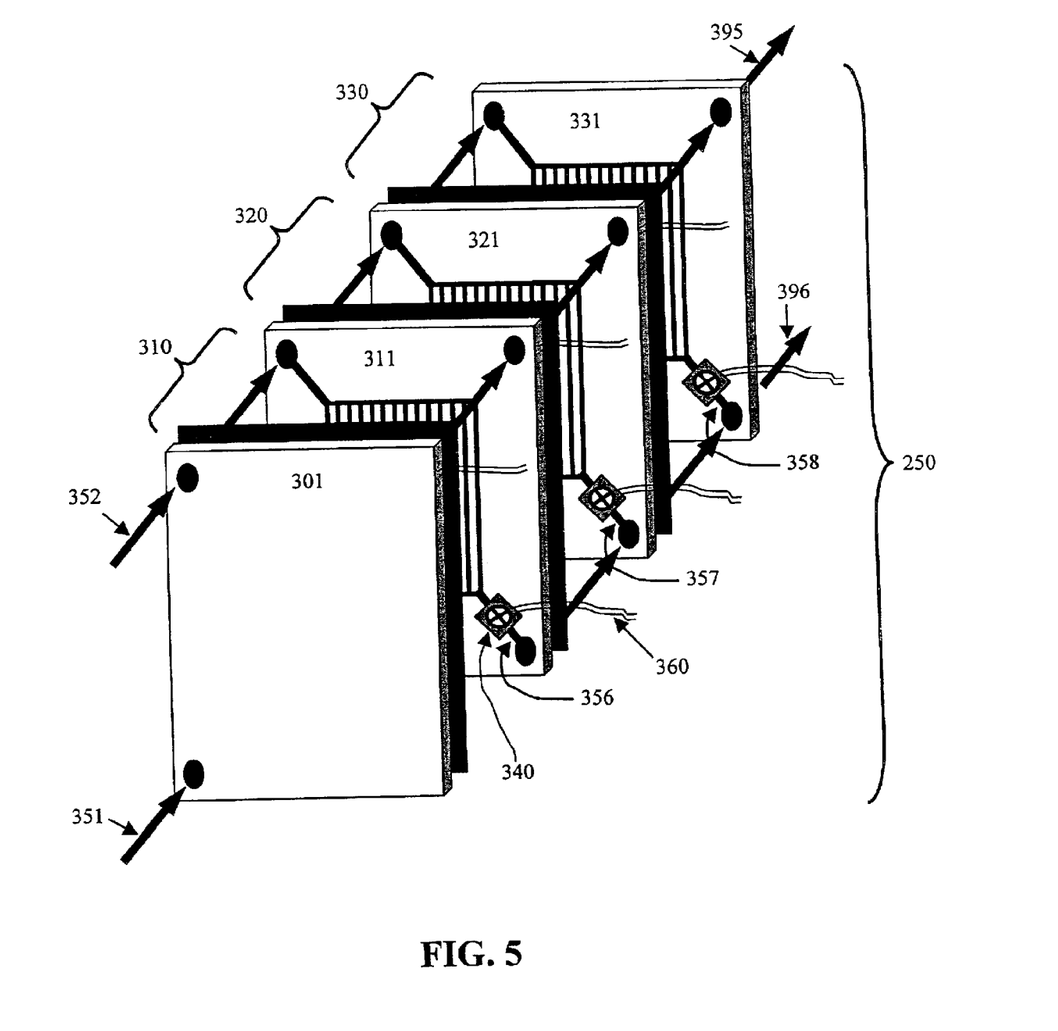
FIG. 5 is a schematic diagram of a fuel cell stack which embodies the principles and concepts of the invention with common fuel and oxidant inlets and outlets and individual outlets from each cell compartment connected internally to the common outlets through micro-electromechanical (MEM) valves.
Figure 8A:
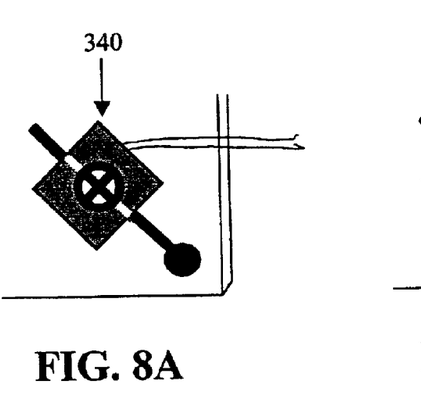
FIGS. 8A and 8B are schematic diagrams of a MEM valve useful in connection with the fuel cell stack of FIGS. 5 and 6 to open and close the outlets individually.
Figure 8B:
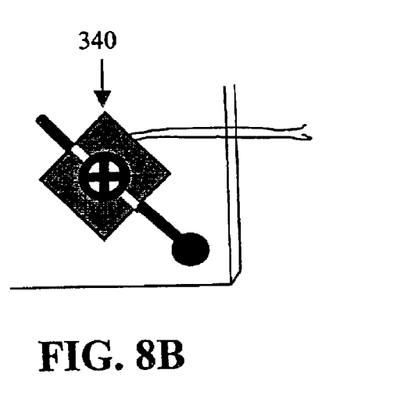

Another three-cell fuel cell stack which embodies the principles and concepts of the invention is shown schematically in FIG. 5 where it is identified by the reference numeral 350. As shown, stack 350 includes cells 310, 320 and 330. Again, the number of cells in the stack is variable and dependent upon the voltage required for a given application. The cells of stack 350, which are supplied with reactants via common fuel inlet line 351 and common oxidant inlet line 352, are essentially the same as the cells of stack 249, except for the inclusion of an individual MEM valve 340 in each of the fuel side and oxidant side outlets 353, 354, 355, 356, 357 and 358. That is to say, the fuel side outlet and the oxidant side outlet of each cell has its own individual openable and closeable MEM valve 340. FIG. 8A depicts valve 340 in an open condition while FIG. 8B depicts valve 340 in a closed condition. The MEM valves are connected externally to an electronic controller 361 by electrical wiring 360. With the exception of the MEM valves 340, the other components of the cell stack 350 are essentially the same as those described for the fuel cell stack 249 of FIG. 3.

Sequential purging of each cell or group of selected cells is achieved by sequentially opening the MEM valves of one cell or group of selected cells while keeping those of other cells or groups of cells closed. Purging frequency and duration of the opening and closing of valves 340 may be controlled by an electronic controller using predetermined time intervals and/or time intervals determined empirically for a given cell stack. It should also be noted that the oxidant side of a given cell may need purging more often than the fuel side, or vice versa. The arrangement of stack 350 facilitates such operation. Downstream from the valves 340, the oxidant side outlets 356, 357 and 358 are connected in fluid communication with a common excess oxidant and oxidant side collection conduit 396. Similarly the fuel side outlets 353, 354 and 355 on the back faces of plates 301, 311 and 321 are connected in fluid communication with a common excess fuel and fuel side collection conduit 395.

Figure 6:
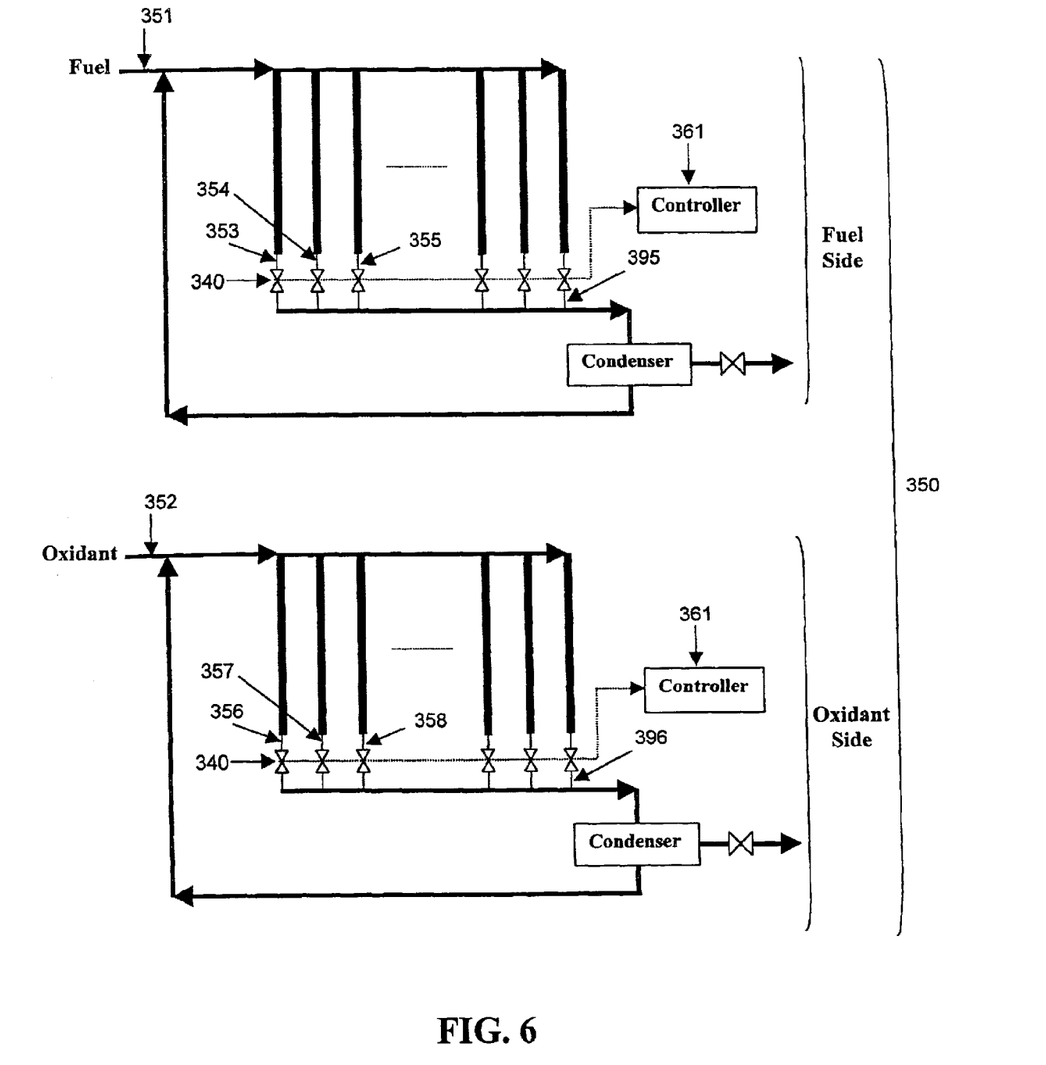
FIG. 6 is a block diagram of the fuel cell stack of FIG. 5.

FIG. 6 is a block diagram of the fluid distribution in the fuel and oxidant sides of each fuel cell for a fuel cell stack configured similarly to that shown in FIG. 5. With the exception of the inclusion of MEM valves between the fuel and oxidant outlets of each cell and the common fuel and oxidant outlets, all other features are essentially the same as those shown in the FIG. 4 block diagram for the fuel cell stack with external sequential purging device.

I claim:

1. A method for operating a fuel cell system made up of a plurality of fuel cells, each including a fuel inlet, an oxidant inlet, an openable and closeable fuel side product outlet and an openable and closeable oxidant side product outlet, said method comprising:
   supplying fuel to said fuel inlets;
   supplying an oxidant to said oxidant inlets; and
   selectively opening the outlets of a first cell of said plurality of cells to thereby selectively and resvectively purge fuel side product and oxidant side product from said first cell.

2. A method as set forth in claim 1, comprising selectively keeping the outlets of other cells of said plurality of cells in a closed condition while one or more outlets of the first cell are open.

3. A method as set forth in claim 1, wherein said step of selectively opening the outlets of said first cell is conducted in such a way that the outlets of the first cell are both open at the same time so as to simultaneously purge fuel side product and oxidant side product from the first cell.

4. A method as set forth in claim 3, comprising selectively keeping the outlets of other cells of said plurality of cells in a closed condition while one or more outlets of the first cell are open.

5. A method as set forth in claim 1, 2, 3 or 4, comprising selectively closing the outlets of said first cell and selectively opening the outlets of a second cell of said plurality of cells to purge fuel side product and oxidant side product from said second cell.

6. A method as set forth in claim 5, comprising selectively keeping the outlets of other cells of said plurality of cells in a closed condition while one or more outlets of the second cell are open.

7. A method as set forth in claim 5, wherein said step of selectively opening the outlets of a second cell is conducted in such a way that the outlets of the second cell are both open at the same time so as to simultaneously purge fuel side product and oxidant side product from the second cell.

8. A method as set forth in claim 7, comprising selectively keeping the outlets of other cells of said plurality of cells in a closed condition while one or more outlets of the second cell are open.

9. A method for operating a fuel cell system made up of a plurality of fuel cells as set forth in claim 1, further comprising selectively opening the outlets of each cell of a group of said plurality of said cells to thereby selectively purge fuel side product and oxidant side product from each of the cells of said group of cells, said group of cells including said first cell.

10. A method as set forth in claim 9, comprising selectively keeping the outlets of other cells of said plurality of cells in a closed condition while outlets of the cells of the group are open.

11. A method as set forth in claim 5, further comprising selectively opening the outlets of each cell of a group of said plurality of cells to thereby selectively purge fuel side product and oxidant side product from each of the cells of said group of cells, said group of cells including said second cell.

12. A method as set forth in claim 11, comprising selectively keeping outlets of other cells of said plurality of cells in a closed condition while the outlets of the cells of said group of cells are open.

13. A method as set forth in claim 9 or 11, comprising closing the outlets of the cells of said group of cells and selectively opening the outlets of each cell of another group of cells of said plurality of cells to thereby selectively purge fuel side product and oxidant side product from each of the cells of said another group of cells.

14. A method as set forth in claim 13, comprising selectively keeping outlets of other cells of said plurality of cells in a closed condition while the outlets of the cells of said another group of cells are open.

15. A method as set forth in claim 9, wherein said step of selectively opening the outlets of each cell of a group of cells is conducted in such a way that the fuel side product outlets of the cells of said group of cells are all open at the same time so as to simultaneously purge fuel side product from each of the cells of said group of cells.

16. A method as set forth in claim 9, wherein said step of selectively opening the outlets of each cell of a group of cells is conducted in such a way that the oxidant side product outlets of the cells of said group of cells are all open at the same time so as to simultaneously purge oxidant side product from each of the cells of said group of cells.

17. A method as set forth in claim 9, wherein said step of selectively opening the outlets of each cell of a group of cells is conducted in such a way that the product outlets of the cells of said group of cells are all open at the same time so as to simultaneously purge fuel side product and oxidant side product from each of the cells of said group of cells.

18. A method as set forth in claim 11, wherein said step of selectively opening the outlets of each cell of a group of cells is conducted in such a way that the fuel side product outlets of the cells of said group of cells are all open at the same time so as to simultaneously purge fuel side product from each of the cells of said group of cells.

19. A method as set forth in claim 11, wherein said step of selectively opening the outlets of each cell of a group of cells is conducted in such a way that the oxidant side product outlets of the cells of said group of cells are all open at the same time so as to simultaneously purge oxidant side product from each of the cells of said group of cells.

20. A method as set forth in claim 11, wherein said step of selectively opening the outlets of each cell of a group of cells is conducted in such a way that the product outlets of the cells of said group of cells are all open at the same time so as to simultaneously purge fuel product and oxidant product from each of the cells of said group of cells.

21. A method for operating a fuel cell system made up of a plurality of fuel cells, each including a fuel inlet, an oxidant inlet, and at least one openable and closeable product outlet, said method comprising:
supplying fuel to said fuel inlets;
supplying an oxidant to said oxidant inlets; and
selectively opening said at least one outlet of a first of said plurality of cells to purge product from said first cell.

22. A method for operating a fuel cell system made up of a plurality of fuel cells as set forth in claim 21, wherein said at least one product outlet of said first cell is a fuel side outlet whereby fuel side product is purged from said first cell.

23. A method for operating a fuel cell system made up of a plurality of fuel cells as set forth in claim 21, wherein said at least one product outlet of said first cell is an oxidant side outlet whereby oxidant side product is purged from said first cell.

* * * * *

UNITED STATES PATENT AND TRADEMARK OFFICE
CERTIFICATE OF CORRECTION

PATENT NO. : 6,893,766 B2
DATED : May 17, 2005
INVENTOR(S) : Trung Van Nguyen

It is certified that error appears in the above-identified patent and that said Letters Patent is hereby corrected as shown below:

Column 3,
Line 51, insert -- The -- between "2)" and "travel".

Signed and Sealed this

Twenty-second Day of November, 2005

JON W. DUDAS
*Director of the United States Patent and Trademark Office*